United States Patent [19]
Rother et al.

[11] Patent Number: 5,919,301
[45] Date of Patent: Jul. 6, 1999

[54] METHOD AND APPARATUS FOR HEAT TREATMENT OF FINE-GRAINED MATERIAL

[75] Inventors: Wolfgang Rother, Oelde; Klaus Adler, Rheda-Wiedenbruck, both of Germany

[73] Assignee: Krupp Polysius AG, Beckum, Germany

[21] Appl. No.: 08/926,223

[22] Filed: Sep. 9, 1997

[30] Foreign Application Priority Data

Feb. 12, 1996 [DE] Germany ............................ 196 49 922

[51] Int. Cl.$^6$ ............................................... C04B 7/48
[52] U.S. Cl. ........................................... 106/761; 106/762
[58] Field of Search .................................. 106/761, 739, 106/762

[56] References Cited

U.S. PATENT DOCUMENTS

| | | | |
|---|---|---|---|
| 3,900,554 | 8/1975 | Lyon ........................................ | 423/235 |
| 4,014,641 | 3/1977 | Shigeyoshi et al. ...................... | 432/58 |
| 4,035,193 | 7/1977 | Miyamoto et al. ...................... | 106/760 |
| 4,080,218 | 3/1978 | Mori et al. .............................. | 106/762 |
| 4,808,108 | 2/1989 | Tiggesbaumker et al. ............... | 432/14 |
| 5,219,544 | 6/1993 | Kupper et al. ........................... | 423/239 |
| 5,336,317 | 8/1994 | Beisswenger et al. ................... | 106/745 |
| 5,364,265 | 11/1994 | Paliard .................................... | 432/106 |
| 5,454,714 | 10/1995 | Paliard .................................... | 432/14 |
| 5,632,616 | 5/1997 | Tutt et al. ............................... | 432/105 |
| 5,713,734 | 2/1998 | Makris et al. ........................... | 432/106 |
| 5,728,357 | 3/1998 | von Harpe .............................. | 423/239.1 |

*Primary Examiner*—Paul Marcantoni
*Attorney, Agent, or Firm*—Reising, Ethington, Barnes, Kisselle, Learman & McCulloch P.C.

[57] ABSTRACT

The invention relates to the heat treatment of fine-grained material which is first of all preheated in a multi-stage cyclone preheater, then further heated in a calcination zone, next finally burnt in a kiln and then cooled. Preheated material and tertiary air are delivered to the reaction chamber of the calcination zone in order to maintain therein a reducing atmosphere for reduction of the $NO_X$ content in the kiln exhaust gases. For the purpose of good adjustability of the reaction temperature in the reaction chamber and for the purpose of a space-saving construction, the preheated material from the second-lowest preheating stage as well as tertiary air are introduced at the bottom into the reaction chamber and an adjustable part-quantity of the preheated material from the third-lowest preheating stage is introduced into an upper region of the calcination zone.

14 Claims, 1 Drawing Sheet

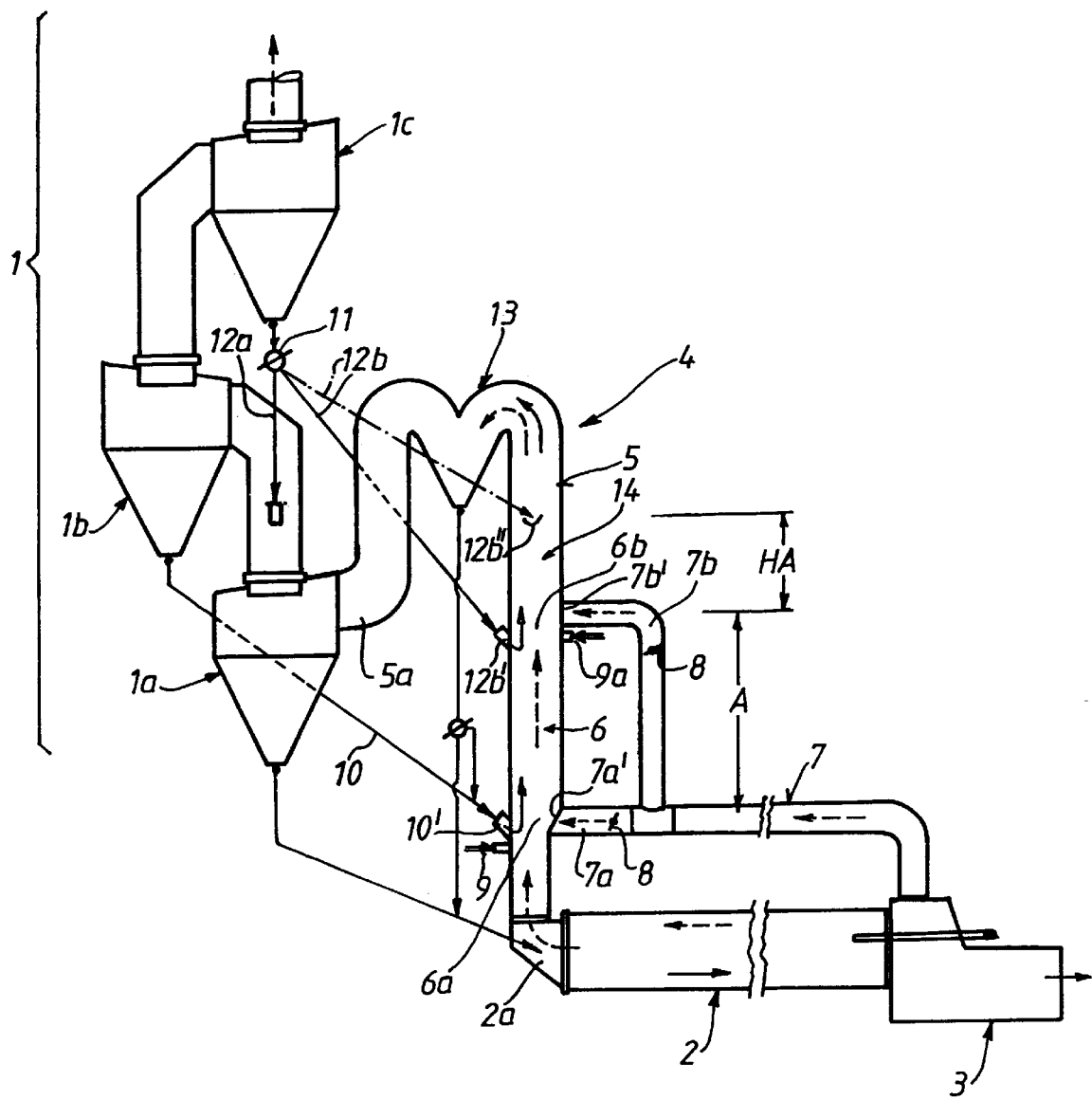

METHOD AND APPARATUS FOR HEAT TREATMENT OF FINE-GRAINED MATERIAL

The invention relates to a method and to apparatus for heat treating fine-grained material, particularly for the production of cement clinker from cement raw meal.

BACKGROUND OF THE INVENTION

Methods and apparatus of the aforesaid type are known in the art in various forms, for example from DE-A-38 17 357 and from the company periodical "POLYSIUS TEILT MIT" No. 171, 1992, pages 8 and 9 (illustrations 15 and 16).

A significant idea in these known embodiments concerns the mode of operation and the construction of the calcination zone in such a way that—also in connection with fuels which are slow to react or difficult to burn—apart from the most thorough calcination possible of the preheated material a marked reduction in the nitrogen oxides ($NO_x$) contained in the kiln exhaust gases can be brought about. For this purpose a quantity of tertiary air is delivered to the reaction chamber within the calcination zone such that a reducing atmosphere is maintained therein. Furthermore the preheated material coming from the second-lowest cyclone stage of the cyclone preheater is divided into at least two part-quantities, of which one first part-quantity is fed into the lower region of this reaction chamber and a second part-quantity is fed into the upper region thereof in order to adjust the reaction temperature in the reaction chamber to a desired temperature which is generally somewhat higher than the usual calcination temperature. In particular the aforementioned division of the preheated material frequently leads to structural problems which have a particularly noticeable disadvantageous effect in the case of subsequent conversion of such heat treatment apparatus.

The object of the invention is to improve the method and apparatus in such a way that with good adjustability of the reaction temperature in the reaction chamber a very thorough reduction of the nitrogen oxides ($NO_x$) can be ensured with a relatively simple and space-saving construction.

SUMMARY OF THE INVENTION

A significant characteristic of the method according to the invention is the introduction of preheated material from the second-lowest preheating stage substantially completely into the lower end region of the reaction chamber, whilst the preheated material from the third-lowest preheating stage is divided into at least two part-quantities, of which a first part-quantity of material is fed into the second-lowest stage of the preheating zone and a second part-quantity of material is fed into the calcination zone at a marked vertical distance above the point in the lower end region of the reactor chamber at which the preheated material from the second-lowest preheating stage is introduced into this reaction chamber. The proportions by quantity of these two part-quantities of material are adjustable in a suitable manner. The quantity of material introduced from the second-lowest preheating stage into the calcination zone is reduced by the quantity of material introduced from the third-lowest preheating stage into the calcination zone. This leads to a corresponding temperature increase and thus to the intended temperature adjustment in the reaction chamber.

Thus since the preheated material from the second-lowest preheating stage is only delivered to the lower end region of the reaction chamber, with the design of conventional preheating zones, particularly in the form of cyclone preheaters, there are usually no difficulties in connecting the material outlet or the material outlets from the second-lowest preheating stage to the lower end region of the reaction chamber by a corresponding material chute or material pipe with a sufficient inclination which ensures that the preheated material flows off unhindered and is distributed in the reaction chamber. On the other hand, only a second part-quantity of the preheated material coming from the next-higher preheating stage, that is to say from the third-lowest preheating stage, is introduced into the upper region of the calcination zone which is markedly higher than this lower end region of the reaction chamber. Thus the vertical position of this third-lowest stage of the preheating zone relative to the calcination zone or the reaction chamber ensures that the proportion of preheated material to be introduced into the region of the calcination zone lying higher up can also be dispersed reliably, i.e. without any flow problems—by way of a suitable chute or pipe—and utilising the kinetic energy of falling of the material at the corresponding point of introduction into the calcination zone, which leads to a relatively compact construction in the region of the preheating zone and calcination zone, not only in the case of new apparatus but also in the case of existing apparatus to be converted.

Since in this method according to the invention only a correspondingly adjustable proportion of the material preheated in the third-lowest preheating stage (which is not so highly preheated as that from the second-lowest preheating stage) is fed into the upper region of the calcination zone, in terms of the method there are further special advantages with regard to a particularly good adjustability of the reaction temperatures which are necessary in the calcination zone or in the reaction chamber.

The reducing atmosphere to be maintained in the reaction chamber can be controlled above all by introducing tertiary air at least into the lower region of the reaction chamber, which tertiary air reacts correspondingly with delivered fuel and can advantageously be adjusted in quantity. In this way—in adaptation to the particular construction of the calcination zone to the particular type of calciner—a very thorough reduction of the nitrogen oxides in the kiln exhaust gases can be reliably ensured.

In this case it has also proved advantageous if the second part-quantity of material from the third-lowest preheating stage to be introduced into the upper region of the calcination zone is chosen to be in a proportion of approximately 20 to 40%, preferably of the order of magnitude of approximately 30%, and the first part-quantity of material is introduced as the main quantity altogether into the second-lowest preheating stage.

In this method according to the invention the procedure is advantageously such that—viewed in each case in the direction of flow of the exhaust gases from the combustion zone (kiln exhaust gases)—an adjustable first part-stream of tertiary air is likewise introduced into the lower region of the reaction chamber as well as after (above) a fuel supply and an adjustable second part-stream of this tertiary air is introduced as upper air into the upper end region of the reaction chamber.

It may also be advantageous here to provide an additional burner (kiln inlet burner) in the kiln inlet to assist in producing a reducing atmosphere in the kiln exhaust gas in the kiln inlet and breaking down $NO_x$ from the main firing. In this way a multi-stage combustion of the fuel introduced into the calcination zone can then be achieved, the combustion stage in the calcination zone forming the said reaction chamber in which an incomplete combustion takes place.

For reasons of the reaction kinetics in the reaction chamber it has also proved particularly advantageous if the distance between the point of introduction of the first part-stream of tertiary air and the point of introduction of the second branch stream of tertiary air or the upper air is so great that the gas residence time between these two introduction points, i.e. in the actual reaction chamber, lies in the range from approximately 0.5 to 1 s, so that the overall height of the reaction chamber is then fixed with a predetermined gas transport speed to be maintained.

In this method according to the invention it is also regarded as advantageous according to a first embodiment if the second part-quantity of material from the third-lowest preheating stage is fed approximately at the height of the point of introduction of the upper air into the upper end region of the reaction chamber and is of such a magnitude that the reaction temperature in this reaction chamber (between the upper and lower end regions thereof) can be set to approximately 900 to 1000° C. Thus the reaction temperature can be adapted in an optimum manner to the desired or necessary reduction of the $NO_x$ content in the kiln exhaust gases.

At least in the cases in which the delivered tertiary air is divided into two part-streams of which one is introduced into the lower end region of the reaction chamber and the other is introduced as upper air into the upper end region of the reaction chamber, it may also be advantageous if further fuel is delivered below the point of introduction of the upper air, in fact as close as possible below this point. In this way the reaction temperature can again be raised somewhat in the portion of the calcination zone lying above the reaction chamber.

In this connection it may then be advantageous according to a second embodiment of the method if—viewed in the flow direction of the kiln exhaust gases—in the calcination zone adjoining the upper end region of the reaction chamber a second part-zone under oxidising burning conditions with temperatures below 1200° C., preferably in a temperature of approximately 900 to 1050° C., is operated as an oxidation zone and if the second part-quantity of material from the third-lowest preheating stage is then fed into this oxidation zone at a corresponding distance (vertical distance) above the point of introduction of the upper air (in contrast to the first embodiment mentioned above). In this way in the calcination zone on the one hand a reaction chamber with a reducing atmosphere is formed and operated quite intentionally in a lower first part-zone and on the other hand an oxidation zone is formed and operated in a second part-zone lying above it, thus ensuring on the one hand a reliable reduction of the nitrogen oxides (in the lower first part-zone or the reaction chamber) and on the other hand markedly improved combustion conditions in the oxidation zone lying above it, in order to ensure a reliable burning up of the carbon monoxide (CO) contained in the kiln exhaust gases rising up out of the reaction chamber—because of the oxidising burning conditions. The reaction temperature prevailing in this oxidation zone should be as high as possible, but should not be higher than 1200° C.; for reasons of operating reliability a favourable temperature range is approximately 900 to 1050° C.

According to another advantageous further development of the method according to the invention it may also from time to time be advantageous in the reaction chamber to inject ammonia ($NH_3$), an ammonia solution or a correspondingly active additive into the exhaust gases flowing through the reaction chamber for the purpose of $NO_x$ reduction. In this case the system operates without additional delivery of so-called upper air (as mentioned above). With the adjustment of the material quantities the temperature range which is advantageous for the so-called SNCR process (=selective non-catalytic reaction) is set in the reaction chamber.

Even if in the method according to the invention a slightly higher heat consumption may occur, this is more than compensated for on the one hand by a markedly more effective $NO_x$ reduction in the kiln exhaust gases and on the other hand the structural advantageous already mentioned above are also provided. Moreover, this method according to the invention can also be operated particularly optimally if fuels which are extremely difficult to burn are used in the calcination zone, such as graphite, petroleum coke of the fluid type and the like, wherein the reaction temperature which is relatively higher supports a complete burning up of these fuels.

THE DRAWING

The invention will be explained further with reference to the drawing (with a single FIGURE) in which an embodiment of apparatus for heat treatment of granular material, particularly for producing cement clinker from cement raw material, is shown quite schematically.

DETAILED DESCRIPTION

The heat treatment apparatus shown in the drawing contains as a preheating zone for the fine-grained material a cyclone preheater 1, which is constructed in a manner which is known per se and through which hot gases flow from from bottom to top, with a plurality of cyclone stages disposed essentially one above the other, of which only the lowest cyclone stage 1a, the second-lowest cyclone stage 1b and the third-lowest cyclone stage 1c are shown in the drawing for the sake of simplicity, each of which—as is known per se—may be at least one cyclone separator (cyclone heat exchanger). According to requirements, this cyclone preheater 1 may contain for example four, five or six cyclone stages disposed essentially one above the other.

For final burning of the preheated material there is provided a kiln in the form of a rotary kiln 2 with a cooler (cooling zone) 3 connected downstream thereof—in the material flow direction—for cooling the burnt material, that is to say the cement clinker.

In this drawing arrows which are depicted by solid lines symbolise the material to be treated and its flow direction, while arrows of broken lines generally indicate the gas flows and the flow direction thereof.

A further important section of this apparatus according to the invention is a calcination zone 4 which is disposed between the rotary kiln 2 and the cyclone preheater 1 and through which inter alia the hot exhaust gases from the rotary kiln 2 flow—according to the broken arrows, In the illustrated embodiment the calcination zone 4 is formed at least by an upright kiln exhaust gas pipe 5 which connects the rotary kiln inlet 2a to the lowest preheater cyclone stage 1a, the end 5a of the kiln exhaust gas pipe opposite the rotary kiln 2 opening into this lowest preheater cyclone stage 1a, so that the latter can also simultaneously form a part of the precalcination zone 4.

A lower first portion of the kiln exhaust gas pipe 5 which extends essentially vertically, that is to say to some extent a first lower part-zone of the calcination zone 4 above the kiln inlet 2a, is constructed as a reaction chamber 6. A tertiary air pipe 7 bringing heated exhaust air from the cooler as tertiary air is connected approximately to this portion of the kiln exhaust gas pipe 5. In the present example this tertiary air pipe 7 is divided into two tertiary air branch pipes 7a, 7b provided with quantity adjusting devices 8. The first tertiary air branch pipe 7a is connected to the lower end region 6a of the reaction chamber 6 at a first or lower level at the point of introduction 7a', and in fact—viewed in the flow direction (broken arrows) of the kiln exhaust gases—downstream of a lower fuel supply 9 for the calcination zone 4, and the second tertiary air branch pipe 7b which forms an upper air supply pipe is connected at a second upper level at the point of introduction 7b' to the upper end region 6b of this reaction chamber 6. Close below this point of introduction 7b' for upper air there may advantageously be disposed a second fuel supply 9a to the calcination zone 4 or into the upper end region 6b of the reaction chamber 6.

The vertical distance A between the two previously defined tertiary air connection points 7a' and 7b' determines the length of the reaction chamber 6, and this preferably takes place in such a way that the gas residence time in the reaction chamber 6 between the end regions 6a and 6b is set to approximately 0.5 to 1 s. In this case it is important that in the reaction chamber 6—as already mentioned above in connection with the explanation of the method according to the invention—a reducing atmosphere for reducing the $NO_X$ content in the exhaust gases of the rotary kiln is maintained.

However, not only tertiary air is supplied to this reaction chamber 6, but also preheated material from the cyclone preheater 1. This takes place in such a way that the preheated material from the second-lowest cyclone stage 1b of the cyclone preheater 1 is introduced substantially completely into the lower region of the reaction chamber 6 by way of a material pipe 10 which—at the point of introduction 10'—is connected to the lower end region 6a of the reaction chamber 6. The preheated material from the third-lowest cyclone stage 1c of the cyclone preheater 1, on the other hand, is divided into at least two part-quantities by a material distribution arrangement 11 of a construction which is known per se (with at least two branch pipe connections for adjustable distribution of the material). Of these two part-quantities the first part-quantity is fed in by way of a first material branch pipe 12a into the second-lowest cyclone stage 1b. On the other hand, the second part-quantity of material is fed in by way of a second material branch pipe 12b into the calcination zone 4 basically at a third level at a marked vertical distance above the point of introduction 10' at which the preheated material from the second-lowest cyclone stage 1b is introduced into the reaction chamber 6—by way of the material pipe 10. According to a first embodiment of the apparatus or of the method this takes place in such a way that the second part-quantity of material is fed in by way of the second material branch pipe 12b at the point of introduction 12b' into the upper end region 6b of the reaction chamber 6. Thus in this case the third-lowest cyclone stage 1c of the cyclone preheater 1 is connected by way of the material distribution arrangement 11 and the material branch pipes 12a and 12b on the one hand to the second-lowest cyclone stage 1b and by way of the second material branch pipe 12b to the upper end region 6b of the reaction chamber 6, the vertical distance between the points of introduction of material 10' and 12b'—as the drawing shows—corresponding approximately to the vertical distance A.

As can be seen in the drawing, the various supplies in the upper end region 6b of the reaction chamber 6 are advantageously chosen so that the second tertiary air branch pipe 7b which serves as the upper air supply is connected at the height of the point of connection or introduction 12b' of the previously mentioned second material branch pipe 12b to the upper end region 6b of the reaction chamber 6.

Thus the distribution and introduction according to the invention of the preheated quantities of material from various preheating stages, namely the second-lowest and the third-lowest cyclone stages 1b, 1c respectively of the cyclone preheater 1 creates on the one hand an optimum adjustability for the reaction temperature in the reaction chamber 6 and on the other hand it is not difficult to recognise that the distribution of the preheated material from the third-lowest cyclone stage 1c, whilst being very simple to carry out, creates particular structural advantages in so far as the material branch pipe 12b leading to the upper end region 6b of the reaction chamber 6 can always have a sufficiently steep incline which, even in the case of subsequent conversion of existing apparatus, can guarantee a reliable flow of the material to be conveyed therein. The supply of raw meal or material via the material branch pipe 12b inevitably lowers the quantity of material in the pipes 12a and 10. As a result the temperature in the reaction chamber 6 is correspondingly raised.

In the embodiment which is illustrated in the drawing, it is also regarded as advantageous if a deflection or mixing chamber 13 is constructed in the kiln exhaust gas pipe 5 in the gas flow direction (broken arrows) at a sufficient distance downstream of the reaction chamber 6. By this construction it can be ensured that the gases flowing in this rear section of the calcination zone 4 are still particularly well mixed together before entering the lowest cyclone stage 1a in order thereby to bring about a subsequent reaction of carbon monoxide and unburnt parts (particles) with the oxygen in these gases. In this case—as indicated by pipes—a part of the entrained material can either be returned to the calcination zone 4 or can already be delivered to the rotary kiln inlet 2a.

In this method according to the invention or in the apparatus according to the invention as explained above, it may also from time to time be advantageous, utilising the adjustable temperature range in the reaction chamber, additionally to inject ammonia ($NH_3$), a corresponding ammonia solution or an effective additive for the purpose of further $NO_X$ reduction, and for this purpose a suitable arrangement which is known per se for the injection of $NH_3$, an $NH_3$ solution or an additive into the reaction chamber 6 can be arranged without it being necessary to illustrate this in detail.

During operation of this apparatus according to the invention using the so-called SNCR process—as already indicated above—the tertiary air branch pipe 7b which delivers the upper air is shut off. The combustion of the fuel introduced into the calcination zone takes place in an oxidising atmosphere. The addition of $NH_3$ or other agents takes place after the delivery of fuel and tertiary air. The optimal temperature window for this SNCR process is set by the distribution of the quantities of material (according to the pipes 10 and 12b). An additional burner disposed in the kiln inlet 2a (as mentioned above) remains in operation in this case. Since the $NO_X$ coming from the rotary kiln 2 can thus be partially reduced, the quantity of $NH_3$ added can be kept lower, which leads to a reduction in costs. CO and unburnt material from the kiln inlet 2a are burnt in the oxidising atmosphere of the furnace in the calcination zone. Thus the arrangement and operation of the kiln inlet burner already explained above in connection with the method according to the invention also brings additional advantages in the application of the so-called SNCR process.

The previously described apparatus for heat treatment or the method which can be carried out therein can be modified in a simple manner if need be. As has already been described above, according to a second embodiment of the invention a second part-zone adjoining the upper end region 6b of the reaction chamber 6 in the calcination zone 4 can be specially constructed and operated as an oxidation zone 14. This oxidation zone 14 can be set inter alia by the upper air supply (at the point of introduction 7b') and by the further fuel supply 9a to oxidation conditions with a temperature of below 1200° C., preferably in a temperature range of approximately 900 to 1050° C.

Whereas in the first embodiment of the apparatus or of the method as described above the second material branch pipe 12b coming from the third-lowest cyclone stage 1c is connected to the upper end region 6b of the reaction chamber 6, according to the second embodiment and corresponding to the dash-dot representation in the drawing this second material branch pipe 12b should instead be connected to the oxidation zone 14 at a distance or vertical distance HA above the connection point for the second tertiary air branch pipe/upper air supply 7b, that is to say still clearly above the upper end region 6b of the reaction chamber 6. Thus the point of introduction 12b" for the part-quantity of material coming from the third-lowest preheater cyclone stage 1c is—just as in the first embodiment—also located at a marked vertical distance, namely the vertical height A plus the vertical distance HA (see the drawing), above the material introduction point 10' for the preheated material introduced from the second-lowest cyclone stage 1b into the lower end region 6a of the reaction chamber 6.

In so far as the alternatives for the introduction of the second part-quantity of material from the third-lowest preheating stage (cyclone stage 1c) or the connection of the second material branch pipe 12b to the calcination zone 12 are concerned, at least two possibilities exist therefor: on the one hand from the outset one single material branch pipe 12b can be installed and fixed either at the upper end region 6b of the reaction chamber 6 (point of introduction 12b') or in the oxidation zone 14 (with the point of introduction 12b"); on the other hand it may also from time to time be advantageous if at a suitable point in the material branch pipe 12b a two-way diverter is installed, from which one branch leads to the point of introduction 12b' in the upper end region 6b of the reaction chamber 6 and a second branch is installed and fixed at the point of introduction 12b" in the oxidation zone 14. Thus in the latter case it is possible to with the aid of the two-way diverter to change over from one mode of operation to the other mode of operation (in each case in adaptation to the compositions of the cement raw meal, types of fuel or the like).

The explanation of the heat treatment apparatus according to the invention with reference to the drawing makes it clear that this apparatus is also particularly well adapted for carrying out the method according to the invention which is described above.

We claim:

1. In a method of heating fine-grained material to produce cement clinker wherein:
   a) the material first is preheated in a preheating zone having a plurality of vertically spaced preheating stages;
   b) calcining the preheated material in an upright calcination zone having a lower part constituting a reaction chamber;
   c) burning the calcined material in a combustion zone to produce cement clinker and gases of combustion containing nitrogen oxide;
   d) cooling the cement clinker in a cooling zone from which exhaust gas flows;
   e) and introducing exhaust gas from said cooling zone into said calcination zone as tertiary gas;
   the improvement comprising:
   f) introducing preheated material from the second lowest preheating stage into said reaction chamber;
   g) delivering a first portion of preheated material from the third lowest preheating stage to said second lowest preheating stage;
   h) delivering a second portion of preheated material from said lowest preheating stage to said calcination zone at a level above that of said reaction chamber; and
   i) delivering said tertiary gas into said calcination zone at the lower end of said reaction chamber.

2. The method according to claim 1 wherein said first portion of said preheated material is greater than that of said second portion.

3. The method according to claim 2 wherein said second portion of said preheated material is between about 20–40% of the total precalcined material.

4. The method according to claim 2 where said second portion of said preheated material is about 30% of the total preheated material.

5. The method according to claim 1 wherein a first part of said tertiary gas is introduced to said calcination zone at a first level adjacent the lower end region of said reaction chamber, and a second part of said tertiary gas is introduced to said calcinating zone at a second level adjacent the upper end of said reaction chamber.

6. The method according to claim 5 including combusting fuel in said reaction chamber at a level between said first and second levels.

7. The method according to claim 5 wherein the time of residence of said tertiary gas in said calcinating zone between said first and second levels is between about 0.5 and 1 s.

8. The method according to claim 5 including adjusting the quantity of said second part of said preheated material delivered to said calcinating zone such as to maintain a temperature in said reaction chamber of about 1000° C.

9. The method according to claim 6 including delivering fuel to said reaction chamber at a level below that of said second level.

10. The method according to claim 1 wherein said second part of said preheated material is delivered to said calcinating zone at a third level above that of said second level.

11. The method according to claim 10 including maintaining the temperature of the third level of said calcinating zone between about 900–1050° C.

12. The method according to claim 1 including injecting a substance into gas flowing through said reaction chamber to reduce nitrogen oxide.

13. The method according to claim 12 wherein said substance comprises ammonia.

14. The method according to claim 12 wherein said substance comprises a solution containing ammonia.

* * * * *